United States Patent [19]

Gilmore

[11] 3,982,451
[45] Sept. 28, 1976

[54] FACING TOOL
[75] Inventor: Guy T. Gilmore, Crosby, Tex.
[73] Assignee: Mutli-Fab, Inc., Houston, Tex.
[22] Filed: Sept. 8, 1975
[21] Appl. No.: 611,355

Related U.S. Application Data
[62] Division of Ser. No. 506,416, Sept. 16, 1974.

[52] U.S. Cl. .................................. 82/4 C
[51] Int. Cl.$^2$ .............................. B23B 3/22
[58] Field of Search ........................ 82/4 C

[56] References Cited
UNITED STATES PATENTS

| | | | |
|---|---|---|---|
| 1,674,372 | 6/1928 | Honneman | 82/4 C |
| 1,841,550 | 1/1932 | Parker | 82/4 C |
| 1,972,022 | 8/1934 | LeMay | 82/4 C |
| 3,202,190 | 8/1965 | Gill | 82/4 C |
| 3,540,328 | 11/1970 | Foss | 82/4 C |
| 3,561,302 | 2/1971 | Keener | 82/4 C |
| 3,772,944 | 11/1973 | Becker et al. | 82/4 C |

Primary Examiner—Harrison L. Hinson
Attorney, Agent, or Firm—Ranseler O. Wyatt

[57] ABSTRACT

A tool for facing the ends of tubular material having means for supporting the tool on the work and having novel means for suspending a rotating member on the supporting means, said rotating member having a cutting tool movable on the work, the cutting tool being removably mounted in the rotating member and having novel means for feeding the cutting tool to the work as the rotating member rotates.

2 Claims, 3 Drawing Figures

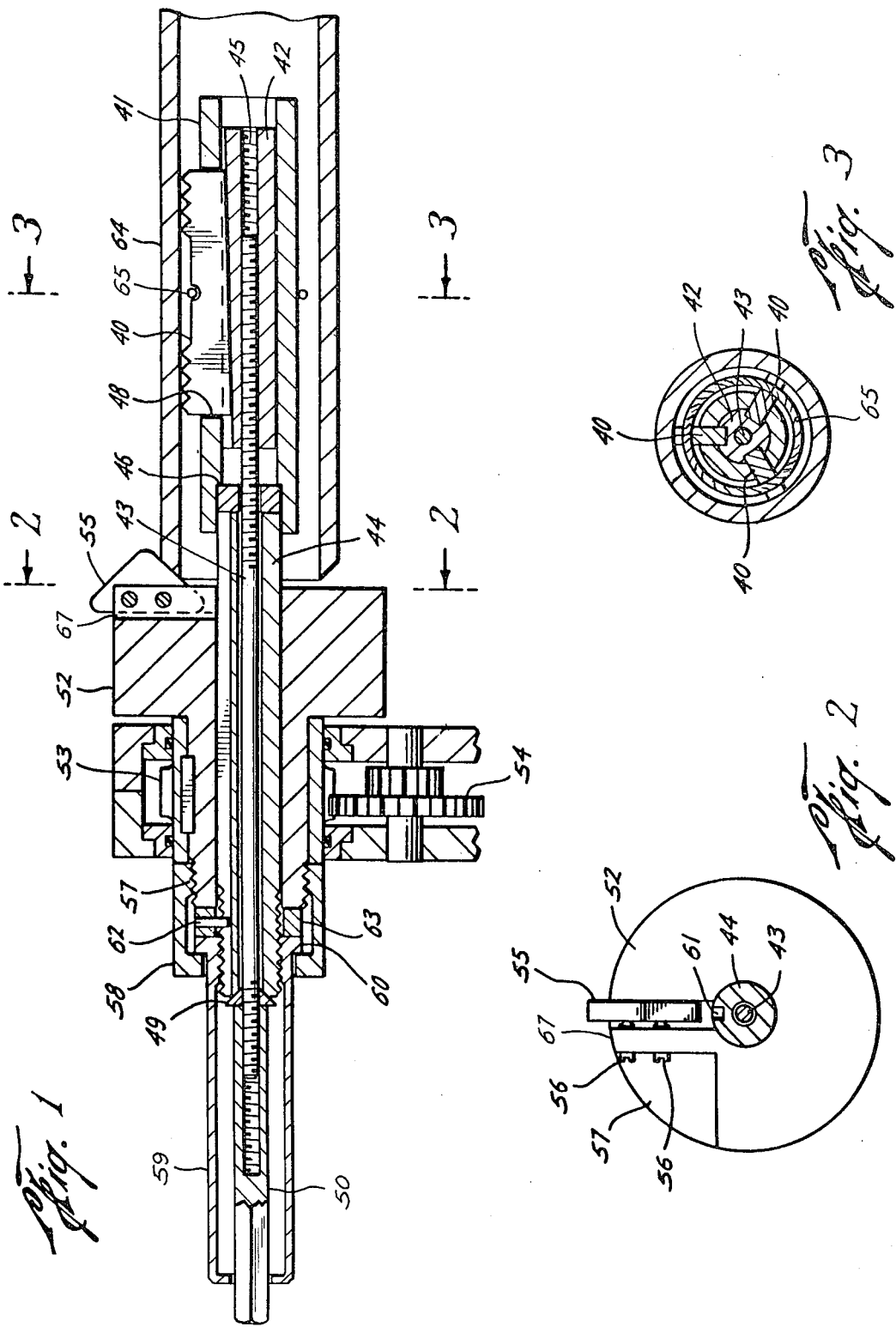

FACING TOOL

This application is a divisional application, being originally a part of application Ser. No. 506,416, filed by me on Sept. 16, 1974.

SUMMARY OF THE INVENTION

A tool for facing the ends of tubular material having a fixed base member mountable on tubular material and having a supporting column and a rotating column on said base member, a gear train housing having a gear train therein for transmitting rotation to said rotating column, the base member being anchored to the work by means of slips movable inwardly and outwardly by means of a mandrel, with means for locking the supporting column against rotation as the rotating column rotates.

BRIEF DESCRIPTION OF THE DRAWINGS

FIG. 1 is a side elevational view, in cross section, of the device;

FIG. 2 is an end view, in cross section, taken on the line 2—2 of FIG. 1; and

FIG. 3 is an end view in cross section, taken on the line 3—3 of FIG. 1.

DESCRIPTION OF THE PREFERRED EMBODIMENTS

In the drawings, the means for mounting the tool on the work consists of slips 40, 40 mounted in the housing 41 and on the mandrel 42. An externally threaded shaft 43 extends through the supporting member 44 and through the axial, internally threaded, longitudinal passageway 45 in the mandrel 42. On the end of the housing 41 is an internally diametrically enlarged area adapted to receive one end of the supporting column 44, which bears against the shoulder 46 in the housing 41. Slots 48 are formed in the housing 41 through which the toothed ends of the slips 40 extend. A head 50, on the other end of the shaft 43, bears against a tapered washer 49, seated in the end of the supporting column 44 and which is rotated to rotate the shaft 43 to move the mandrel longitudinally. When the mandrel 42 is moved in one direction, the tapered surface thereof will bear against the slips 40 and will move the slips 40 outwardly into engagement with the inside wall of the tubular material 64 by the action of the springs 65 mounted on the slips 40.

When the slips 40 are moved into engagement with the tubular material being worked on, the rotating member 52 is mounted on the supporting column 44, and the ring gear 53 on said rotating member is moved into engagement with the gear train 54. One end of the rotating member 52 is diametrically enlarged, and a slot 67 is formed therein to receive the cutting tool 55 and a portion of said enlarged area is cut away, as at 57, to permit access to the mounting screws 56, 56. The opposite end of the rotating member is externally threaded as at 57 to receive the cap 58 which is internally threaded at one end and has an inwardly extending flange at the other end. The handle 59 is tubular and has an outwardly extending flange 60 on its lower end which will abut the internal flange of the cap 58, and which is internally threaded at said lower end to receive the external threads on the end of the supporting column 44 and a slot 61 is formed longitudinally in the supporting column 44 into which the key 62 is mounted by means of the ring 63.

As the gear train 54 rotates, the rotating member 52 is rotated and the cutting member 55 applied to the end of the tubular material 64 to cut a beveled face. Rotation of the handle 59 in a clockwise direction moves the rotating member 52 into the work. The ring 63 and key 62 seated in the slot 61 retains the housing 44 against rotation as the cutter head rotates.

The tool is mounted in the work by inserting the slip housing into the tubular material, as 64, with the slips 40 in a retracted position, and rotating the head 50 in a clockwise direction, moving the mandrel 42 inwardly, and causing the slips to be moved laterally against the inside wall of the tubing being faced. The rotating member 52 is then rotated with the cutter 55 applied to the face to be cut and the cutter fed into the work as it progresses by means of the handle 59 mounted on the threaded end of the shaft 44. When the cut is completed, the head 59 is rotated in a reverse direction, causing the mandrel 42 to move inwardly, and springs 65 retract the slips 40, releasing the housing 41 and the tool withdrawn from the tubing. If the slips do not immediately release upon inward movement of the mandrel 42, a few light hammer taps on the head 59 will release them.

What I claim is:

1. A facing tool having a base member to be mounted in a tube, a supporting column extending from said base member and anchored thereto by means of an axial shaft, a rotating column on said supporting column and a gear train extending from a source of power to said rotating column, a slip housing formed by said base member, and said supporting column and retractible slips mounted in said housing, a mandrel in said housing, bearing against said slips, and movable longitudinally to selectively extend and retract said slips laterally, said axial shaft extending through the supporting column and having a head on the extended end, adjacent said supporting column, and a handle secured to said supporting column, the longitudinal movement of said rotating member being effected by rotating said handle in a selected direction.

2. The device defined in claim 1 wherein said handle is mounted on said supporting column by means of external threads on said supporting column, and a longitudinal slot is formed in said supporting column in said threaded area, and a key extends into said slot, causing the supporting column to remain fixed while the rotating member rotates.

* * * * *